United States Patent
Sullivan

(10) Patent No.: US 6,503,310 B1
(45) Date of Patent: Jan. 7, 2003

(54) LASER MARKING COMPOSITIONS AND METHOD

(75) Inventor: Robert Michael Sullivan, Washington, PA (US)

(73) Assignee: DMC2 Degussa Metals Catalysts Cerdec AG, Frankfurt (DE)

(*) Notice: Subject to any disclaimer, the term of this patent is extended or adjusted under 35 U.S.C. 154(b) by 216 days.

(21) Appl. No.: 09/598,507

(22) Filed: Jun. 21, 2000

Related U.S. Application Data

(60) Provisional application No. 60/140,414, filed on Jun. 22, 1999.

(51) Int. Cl.[7] ............ C09D 11/00; C09C 1/36; C04B 14/00
(52) U.S. Cl. .......... 106/31.6; 106/436; 106/479
(58) Field of Search ............ 106/31.6, 4.6, 106/479

(56) References Cited

U.S. PATENT DOCUMENTS

| | | |
|---|---|---|
| 4,327,283 A | 4/1982 | Heyman et al. |
| 4,515,867 A | 5/1985 | Bleacher et al. |
| 4,541,340 A | 9/1985 | Peart et al. |
| 4,651,313 A | 3/1987 | Guez |
| 4,769,310 A | 9/1988 | Gugger et al. |

(List continued on next page.)

FOREIGN PATENT DOCUMENTS

| | | |
|---|---|---|
| DD | 201 136 | 7/1983 |
| DE | 3738330 | 5/1988 |
| DE | 4212429 | 10/1993 |
| EP | 637517 | 2/1995 |
| EP | 0 761 377 A1 | 3/1997 |
| EP | 0 782 933 A1 | 7/1997 |
| FR | 2 732 917 | 10/1996 |
| JP | 01222994 | 9/1989 |
| JP | 01222995 | 9/1989 |
| JP | 02165001 | 6/1990 |
| JP | 0320031 | 11/1991 |
| JP | 04198366 | 7/1992 |
| JP | 07060464 | 3/1995 |
| JP | 07237350 | 9/1995 |
| JP | 07266695 | 10/1995 |
| JP | 08031682 | 2/1996 |
| JP | 07071726 | 3/1997 |
| WO | WO95/13195 | 5/1995 |
| WO | WO96/32221 | 10/1996 |
| WO | WO99/16625 | 4/1999 |
| WO | WO99/25562 | 5/1999 |

OTHER PUBLICATIONS

RD 367039 A, Nov. 11, 1994, abstract.*
U.S. patent application Ser. No. 08/951,441, Axtell, III et al. filed Oct. 16, 1997.
U.S. patent application Ser. No. 08/970,297, Axtell, III et al. Nov. 14, 1997.
Hahn et al., "Firing PbO–Free Glass Enamels Using the cw–$CO_2$ Kaser", Glastech. Ber. Glass Sci. Technol., 1996, pp. 1–6, vol. 69, No. 1, no month available.
Maureer et al., "High Speed Laser Marking", Semiconductor Fabtech, no date available.
Control Laser Corporation, "Laser Marking: Design and Process Fundamentals", On–Line Laser Technology Library, undated printout from web site: www.controllaser.com, no date availabel.

Primary Examiner—Helene Klemanski
Assistant Examiner—Veronica F. Faison
(74) Attorney, Agent, or Firm—Daniel P. Cillo; Eckert Seamans Cherin & Mellott, LLC

(57) ABSTRACT

Laser markable coatings include a marking pigment and a fixing material. The marking pigment may comprise titanium dioxide, zinc oxide, zinc sulfide or the like. The fixing material may comprise bismuth trioxide, antimony oxide and the like, and preferably has a melting temperature below 1,300° C. A preferred laser marking composition includes $TiO_2$ and $Bi_2O_3$ in a weight ratio of about 1:1. After application to a substrate and laser irradiation, the fixing material stabilizes the resultant mark.

40 Claims, 2 Drawing Sheets

U.S. PATENT DOCUMENTS

| | | |
|---|---|---|
| 4,847,181 A | 7/1989 | Shimokawa |
| 4,854,957 A | 8/1989 | Borrelli et al. |
| 4,861,620 A | 8/1989 | Azuma et al. |
| 4,912,298 A | 3/1990 | Daniels et al. |
| 5,030,551 A | 7/1991 | Herren et al. |
| 5,061,341 A | 10/1991 | Kildal et al. |
| 5,063,137 A | 11/1991 | Kiyonari et al. |
| 5,075,195 A | 12/1991 | Babler et al. |
| 5,091,284 A | 2/1992 | Bradfield |
| 5,111,523 A | 5/1992 | Ferlier et al. |
| 5,206,280 A | 4/1993 | Williams |
| 5,350,792 A | 9/1994 | Hess et al. |
| 5,397,686 A | 3/1995 | Dominick et al. |
| 5,409,742 A | 4/1995 | Arfsten et al. |
| 5,523,125 A | 6/1996 | Kennedy et al. |
| 5,543,269 A | 8/1996 | Chatterjee et al. |
| 5,554,335 A | 9/1996 | Fields et al. |
| 5,560,769 A * | 10/1996 | Conner et al. .......... 106/286.5 |
| 5,560,845 A | 10/1996 | Birmingham, Jr. et al. |
| 5,578,120 A * | 11/1996 | Takahashi et al. .......... 106/401 |
| 5,599,869 A | 2/1997 | Kurz |
| 5,609,778 A | 3/1997 | Pulaski et al. |
| 5,637,244 A | 6/1997 | Erokhin |
| 5,740,941 A | 4/1998 | Lemelson |
| 5,760,367 A | 6/1998 | Rosenwasser et al. |
| 5,761,111 A | 6/1998 | Glezer |
| 5,767,483 A | 6/1998 | Cameron et al. |
| 5,783,507 A | 7/1998 | Sakoske |
| 5,789,466 A | 8/1998 | Birmingham, Jr. et al. |
| 5,804,342 A | 9/1998 | Paz-Pujalt et al. |
| 5,853,955 A | 12/1998 | Towfiq |
| 5,866,644 A | 2/1999 | Mercx et al. |
| 6,075,223 A | 6/2000 | Harrison |

\* cited by examiner

LASER MARKING COMPOSITIONS AND METHOD

CROSS-REFERENCE TO RELATED APPLICATION

This application claims the benefit of provisional application Ser. No. 60/140,414 filed Jun. 22, 1999.

FIELD OF THE INVENTION

The present invention relates to the production of laser markable coatings that are durable and have high contrast, without using environmentally suspect materials. The coatings can be used to put identification or tracking marks on objects such as printed circuit boards and other types of products and packaging.

BACKGROUND INFORMATION

Use of $TiO_2$ as a laser markable pigment in plastic compositions is well known, for example, as disclosed in U.S. Pat. No. 5,091,284. Additives have been combined with $TiO_2$ to increase the contrast by increasing the whiteness of the background, or by improving the dispersion and thereby increase the whiteness, as disclosed in U.S. Pat. Nos. 5,206,280, 5,560,845 and 5,789,466. Similarly, two-layer systems have been used with one contrasting colored layer over another. A laser is used to remove or destroy the upper layer, producing a mark by revealing the underlayer, as disclosed in U.S. Pat. Nos. 4,515,867, 5,111,523, 5,350,792 and 5,599,869. Titanium dioxide has also been coated with a glass forming component prior to its incorporation into the base substrate, as disclosed in U.S. Pat. No. 5,853,955.

Laser marking materials and processes are disclosed in U.S. application Ser. No. 08/951,411 filed Oct. 16, 1997, and U.S. application Ser. No. 08/970,297 filed Nov. 14, 1997, which are incorporated herein by reference.

Conventional laser markable coatings typically use either environmentally undesirable pigmentation-containing materials such as lead and hexavalent chromium to produce durable marks, or use less toxic alternatives that give marks with poor durability. Less toxic pigments are generally unsatisfactory for use in a coating because the mark produced by degrading $TiO_2$ with a laser is of poor durability, and can be easily removed by scrubbing with water or solvent.

SUMMARY OF THE INVENTION

The present invention combines a marking pigment that gives a high contrast laser mark with a material that "fixes" the mark and improves its durability. The combination of $TiO_2$ or other suitable pigments with a fixing material increases the durability of the mark, rendering it washable and increasing its wearability.

An aspect of the present invention is to provide a laser marking material comprising at least one marking pigment, and at least one fixing material. The fixing material may be bismuth trioxide, antimony oxide, lead oxide, vanadium pentoxide, molybdenum trioxide, alkaline earth silicates and/or alkaline earth aluminosilicates.

Another aspect of the present invention is to provide a laser marking coating comprising liquid carrier and a laser marking material. The laser marking material comprises at least one marking pigment, and at least one fixing material, e.g., bismuth trioxide, antimony oxide, lead oxide, vanadium pentoxide, molybdenum trioxide, alkaline earth silicates and alkaline earth aluminosilicates.

A further aspect of the present invention is to provide a method of marking the surface of a substrate. The method includes the steps of applying a marking material comprising a marking pigment and a fixing material to the surface of the substrate, and irradiating a portion of the marking material with at least one beam to adhere the irradiated marking material on the surface of the substrate and to form a permanent marking thereon comprising the marking pigment and the fixing material.

These and other aspects of the present invention will be more apparent from the following description.

DETAILED DESCRIPTION

Figure 1A:
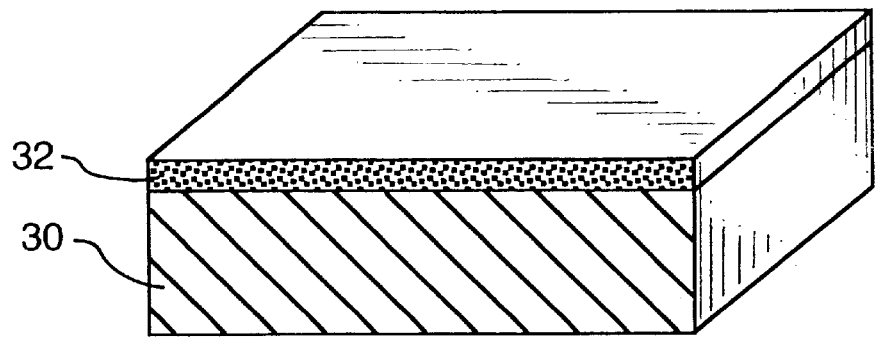
FIGS. 1a–1c are partially schematic cross-sectional views of a substrate, illustrating a laser marking method in accordance with an embodiment of the present invention.

The laser marking compositions of the present invention comprise a marking pigment such as titanium dioxide which is strongly discolored by laser light, in combination with a fixing material such as a metal oxide that melts below about 1,300° C. Although titanium dioxide is primarily described herein as the marking pigment of the present compositions, it is to be understood that additional marking pigments may be used in accordance with the invention.

When $TiO_2$ is conventionally formulated as the pigment portion of a typical organic coating formulation, and then subjected to laser radiation from a YAG laser or the like, the irradiated portion of the organic binder is destroyed. The titanium dioxide is discolored, producing a dark mark. However, in the absence of an organic binder, the discolored pigment is easily removed by scrubbing. If left undisturbed, the titanium dioxide will eventually re-oxidize and the mark will fade.

In accordance with the present invention, an additional fixing material is blended with the titanium dioxide or other pigment. The fixing material melts under the influence of the laser and binds and stabilizes the discolored pigment. The laser mark is therefore resistant to both scrubbing and re-oxidation. Suitable fixing materials include bismuth trioxide ($B_2O_3$), antimony oxide, lead oxide, vanadium pentoxide, molybdenum trioxide, alkaline earth silicates, and alkaline and alkaline earth aluminosilicates. The fixing material preferably has a melting point below about 1,300° C. in order to effectively stabilize the laser marks.

In a preferred embodiment of the invention, the weight ratio of the marking pigment to the fixing material is from about 1:10 to 10:1 more preferably from about 1:5 to 5:1. For example, a ratio of 1:1 $TiO_2:Bi_2O_3$ provides a good balance between whiteness of the background and durability of the mark. Whiter metal oxides such as antimony trioxide may be used over a wider range of ratios, subject to limitations of opacity concerns of the formulated coating.

The present marking materials may be formulated as the pigment portion of typical organic coating compositions, having pigment to binder ratios ranging from about 0.5:1 to about 15:1. Organic coating formulations are familiar to those skilled in the art. The present marking materials may be applied to the desired substrate by conventional coatings vehicles. Such vehicles are known to those skilled in coating technologies, and include thermoset and thermoplastic systems, air curing vehicles such as alkyds, and acrylic, polyester, epoxy and urethane resins reacted with amino, amido, melamine, urea, glycoluril or isocyanate curing agents. It should be recognized that other additives, catalysts, adhesion promoters, surfactants and the like may be added to such compositions to improve various coatings properties, such as adhesion, cure response, and pigment dispersion. Such additives are known in the art.

In accordance with the present invention, various substrate materials can be marked. For example, the present method may be used to mark glass, ceramic, brick, stone, metal, composite and plastic substrates. Exemplary glass substrate compositions include lead as well as lead-free glasses such as soda lime silicates, borosilicates, aluminum silicates, fused silica and the like. Typical ceramic substrates include tiles, sanitary ware, stoneware bodies, porcelain bodies and bricks, as well as electronic quality ceramic substrates such as silica, alumina, aluminum nitride, etc. Stone substrates include marble, granite, slate, limestone and the like. Suitable metal substrates include steel, brass, copper, aluminum, tin, zinc and the like. Typical plastic substrates include PVC, polyamides, polyolefins, polyethylenes, polycarbonates and polytetrafluoroethylene. Combinations of the above substrate materials may also be used, such as porcelain enamelled steel substrates, glass coated ceramic bodies and glass enamelled bodies.

Substrates that may be marked in accordance with the present invention include printed circuit boards, automotive parts, automotive glass, aerospace parts, medical devices, electronic devices, tooling, consumer products, packaging, glass bottles, metal cans, metal tags, bricks, tiles, plumbing, electrical and construction supplies, lighting and the like.

The coating material may be applied to the substrate by any suitable technique such as spraying, dipping, rolling, brushing, doctor blading, and the like. The layer of marking material is typically applied to the substrate with a thickness of at least 0.1 micron, preferably from about 1 to about 300 microns, more preferably from about 5 to about 200 microns, and most preferably from about 10 to about 100 microns. The coatings are preferably cured after they are applied to the substrate. Curing may be accomplished by heating, UV radiation, air drying or the like. The cured coating is then marked with a conventional laser, preferably to convert the light coating to a dark marking in the region of laser irradiation.

Figure 1B:
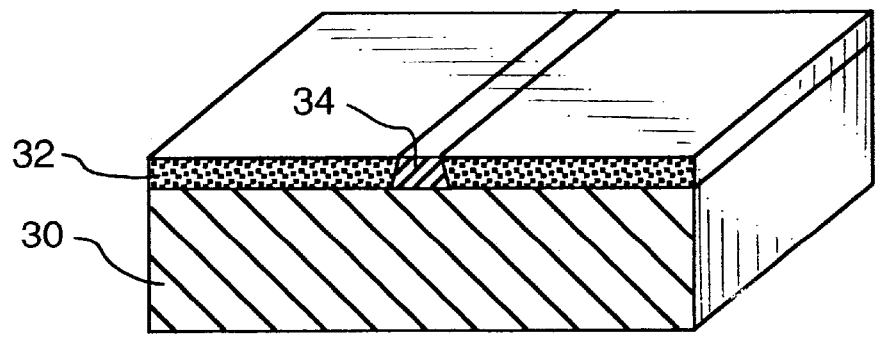
Figure 1C:
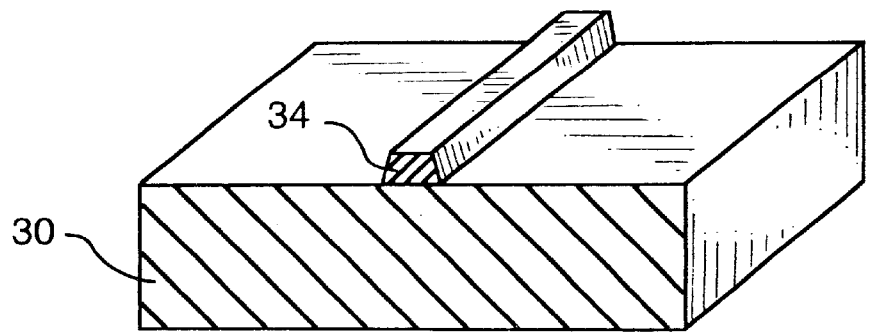

FIGS. 1a–1c illustrate a laser marking method in accordance with an embodiment of the present invention. In FIG. 1a, a substrate 30 has a layer of marking material 32 applied thereto. FIG. 1b illustrates the substrate 30 and marking material 32 after a portion of the marking material 32 has been irradiated by a laser (not shown) which travels across and projects a beam roughly perpendicular to the upper surface of the layer of marking material 32. The irradiated portion 34 is adhered t the surface of the substrate 30 and forms a permanent marking thereon. In FIG. 1c, the non-irradiated portion of the marking material 32 has been washed off, leaving the irradiated marking 34 on the substrate 30.

Figure 2A:
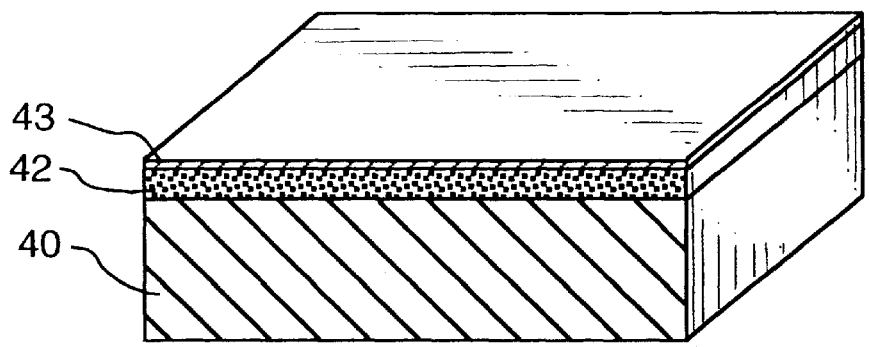
FIGS. 2a–2c are partially schematic cross-sectional views of a substrate, illustrating a laser marking method in accordance with another embodiment of the present invention.
Figure 2B:
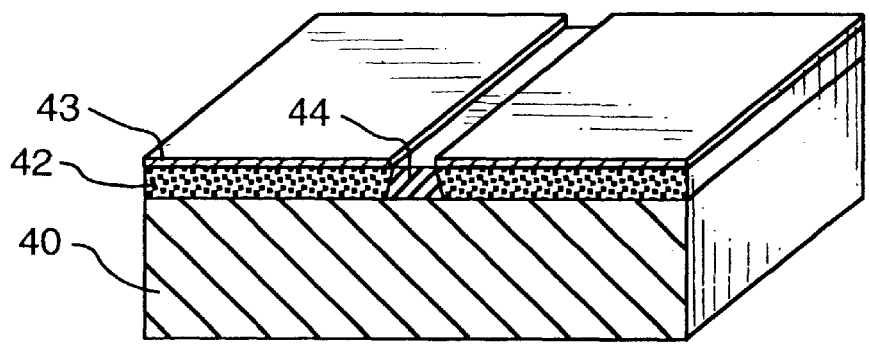
Figure 2C:
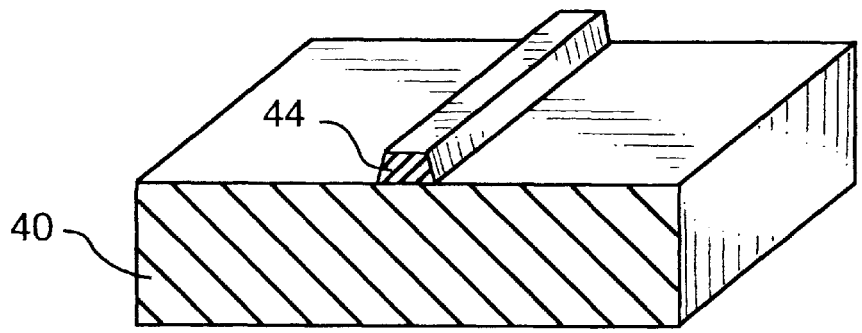

FIGS. 2a–2c illustrate a laser marking method in accordance with another embodiment of the present invention. In FIG. 2a, a layer of marking material 42 is adhered to an adhesive sheet of backing material 43. The backing material may comprise paper, plastic film or the like. The layer of marking material 42 and backing material 43 are applied to the substrate 40. FIG. 2b illustrates the substrate 40, marking material 42 and backing material 43 after a portion of the marking material 44 has been irradiated by a laser (not shown) which travels across and projects a beam perpendicular to the surface of the layer of marking material 42. The irradiated portion 44 is adhered to the surface of the substrate 40 and forms a permanent marking thereon. In FIG. 2c, the non-irradiated portion of the marking material 42 has been removed by peeling the backing material 43 and non-irradiated marking material 42 away from the substrate 40. The irradiated marking 44 remains permanently adhered to the substrate 40.

Various methods may be used to apply the marking material to the surface of the substrate. The substrate surface can be coated with powders of marking material or, preferably, it can be coated with a dispersion of the powders in a suitable media. Water based media are preferred because of their minimal environmental impact, but solvent based media can also be used to control drying rate, dispersion or moisture sensitivity of certain marking materials. In accordance with one embodiment, sol gel materials may be used to apply the marking material to the substrate. Where dispersions are used, the deposited layer can be dried prior to the irradiation step, however this is not necessary. The marking material in a water or solvent dispersion can be applied onto the substrate surface by various methods such as screen printing, brushing, spraying, roll coating, dipping, flow coating, electrostatic application and doctor blading. The marking materials can also be dispersed in high temperature waxes or polymers and applied to a substrate surface from a hot melt or by rubbing the surface of the substrate with such a material. Alternatively, the layer of marking material may be applied in the form of a tape, sticker or decal, and can be on the surface thereof or dispersed therein.

After the marking material is applied to the surface of the substrate, a selected portion of the marking material is irradiated with a beam to adhere the irradiated marking material to the substrate and to form a permanent marking thereon. For many types of markings, the selected portion of the marking material may comprise from about 1 to about 99 percent of the total surface area of the layer of marking material, typically from about 5 to about 95 percent. A laser is preferably used to selectively irradiate the marking material. However, other forms of focused energy may be used in accordance with the present invention. Irradiation may be achieved by moving a laser beam over a stationary substrate using conventional beam steering methods, by moving the substrate in relation to the laser beam and/or by masking the substrate. Laser irradiation is typically achieved by directing the beam directly against the layer of marking material, but may also be achieved by directing the beam through a sufficiently transparent substrate.

Suitable lasers for use in accordance with the present invention include neodymium:yttrium aluminum garnet (Nd:YAG) lasers, carbon dioxide ($CO_2$) lasers, diode lasers, excimer lasers and the like.

Typical YAG lasers emit light in the near-infrared spectrum at wavelengths of 1064 nm. Such lasers typically have continuous power outputs of from about 1 to about 50 watts, and can be operated in a pulsed mode at typical peak powers of from about 1 watt to about 45 kilowatts. For pulsed mode operation, frequencies of from about 1 to about 64,000 pulses/second may be used.

Typical $CO_2$ lasers emit light in the far-infrared region of the spectrum, with intensity spikes at wavelengths of 9.8 and 10.6 microns. Such $CO_2$ lasers typically operate at a continuous output power of from about 1 to about 40 watts.

In accordance with the present invention, the size of the laser spot that impinges the marking material is typically greater than 0.1 micron in diameter, preferably from about 40 to about 500 microns, and more preferably from about 50 to about 125 microns. The speed at which the laser beam travels across the surface of the marking material preferably ranges from 0 to about 100 inches/second (up to about 250 cm/second), more preferably from about 1 or 2 to about 20 inches/second (about 2.5 or 5 to 50 cm/second) for most thicknesses and compositions of marking material. The laser beam may be projected with a seam overlap of 0 to 100 percent, preferably from about 10 to about 90 percent for many applications. The laser parameters are controlled in order to provide sufficient localized heating of the marking material while avoiding unwanted damage to the substrate.

The laser beam, the movement of which can be controlled by a computer, may be used to create discrete symbols or designs or, alternatively, may be serially indexed across the surface of the marking material to create multiple symbols or designs at the same time. For example, a word may be created by separately making each letter of the word with the laser, or by rastering the laser across the entire word to form all of the letters at the same time.

During the irradiation step, the surface of the substrate may be exposed to any desired type of atmosphere. For example, the atmosphere may comprise air at atmospheric, sub-atmospheric or super-atmospheric pressures. Furthermore, the atmosphere may comprise an inert gas such as nitrogen, argon or carbon dioxide, an oxidizing atmosphere such as air or oxygen, a reducing atmosphere such as hydrogen or carbon monoxide, or a vacuum.

Oxidizing or reducing gases can be used in a combination with inert gases. It is also possible to control the atmosphere on the surface of the substrate through the type of media the marking material is dispersed in. The atmosphere to which the surface of the substrate is exposed may affect the color and the quality of the mark. A single laser beam may be used for marking in accordance with the present invention. Alternatively, two or more laser beams may be used. For example, a first laser beam may be used to preheat the marking material and substrate, followed by a second laser which is used to adhere the marking material to the preheated substrate. This is particularly advantageous for marking glass because preheating may help to reduce internal stress and micro-cracking that can result from the laser marking operation.

In accordance with a preferred embodiment of the invention, after the selected portion of the marking material has been irradiated, the non-irradiated portion of the marking material is removed from the substrate. In the embodiment shown in FIGS. 1a–1c, the non-irradiated portion of the marking material may be removed by methods such as washing, brushing off, vacuuming, subliming or blowing off the surface. In the embodiment shown in FIGS. 2a–2c, the non-irradiated portion of the marking material remains adhered to the adhesive sheet 43, and may be removed from the substrate 40 by peeling the adhesive sheet and non-irradiated layer of material away from the substrate.

Various types of marks may be produced in accordance with the present invention. For example, the marks may comprise alphanumeric symbols, graphics, logos, designs, decorations, serializations, bar codes, two dimensional matrices and the like.

The following compositions are examples of laser marking compositions of the present invention. The listed amounts are weight percentages.

Composition 1:
polyester resin 27.6%
hexamethoxymethyl melamine 18.9%
bismuth oxide/titanium dioxide blend (1:1 ratio) 33.3%
dispersing surfactant 0.8%
talc 11.9%
propylene glycol ether solvent 3.5%
silane adhesion promoter 1%
sulfonic acid catalyst 1.8%
rheological control agent 1.2%
Composition 2:
waterbased epoxy resin 66.5%
bismuth oxide/titanium dioxide blend (1:1 ratio) 20%
hexamethoxymethyl melamine 2%
propylene glycol ether cosolvent 4.4%
silane adhesion promoter 0.5%
dispersing surfactant 0.75%
dimethylethanolamine 0.25%
deionized water 5.6%
Composition 3:
polyester resin 28.9%
polyol modified hexamethoxymethyl melamine 17.3%
dispersing surfactant 0.4%
bismuth trioxide 15.9%
antimony trioxide 15.9%
silane adhesion promoter 1.1%
p-toluenesulfonic acid catalyst 0.1%
propylene glycol solvent 20.4%

The above compositions were mixed, applied to a glass substrate and then cured in a forced air oven at between 250 and 380° F. and marked with a YAG laser set to between 30 and 32 amps, pulse rate of 30,000 pulses/sec, writing speed of 30 inches/sec. Dark, high contrast, durable marks were obtained that made 100% machine readable bar codes with a hand held bar code reader.

Whereas particular embodiments of this invention have been described above for purposes of illustration, it will be evident to those skilled in the art that numerous variations of the details of the present invention may be made without departing from the invention as defined in the appended claims.

What is claimed is:

1. A laser marking material comprising a mixture of:
   at least one marking pigment; and
   bismuth trioxide as a fixing material.

2. The laser marking material of claim 1, wherein the marking pigment comprises titanium dioxide, zinc oxide and/or zinc sulfide.

3. The laser marking material of claim 1, wherein the marking pigment comprises titanium dioxide.

4. The laser marking material of claim 1, wherein the marking pigment comprises titanium dioxide.

5. The laser marking material of claim 1, wherein the weight ratio of the marking pigment to the fixing material is from about 1:10 to about 10:1.

6. The laser marking material of claim 1, wherein the weight ratio of the marking pigment to the fixing material is from about 1:5 to about 5:1.

7. The laser marking material of claim 1, wherein the weight ratio of the marking pigment to the fixing material is about 1:1.

8. The laser marking material of claim 1, wherein the fixing material has a melting point below about 1,300° C.

9. A laser marking coating comprising:
a liquid carrier; and
a laser marking material, wherein the laser marking material comprises:
   at least one marking pigment; and
   bismuth trioxide as a fixing material.

10. The laser marking coating of claim 9, wherein the marking pigment comprises titanium dioxide, zinc oxide and/or zinc sulfide.

11. The laser marking coating of claim 9, wherein the weight ratio of laser marking material to carrier is from about 0.5:1 to about 15:1.

12. The laser marking coating of claim 9, wherein the marking pigment comprises titanium dioxide.

13. The laser marking coating of claim 9, wherein the marking pigment comprises titanium dioxide.

14. The laser marking coating of claim 9, wherein the weight ratio of the marking pigment to the fixing material is from bout 1:10 to about 10:1.

15. The laser marking coating of claim 9, wherein the weight ratio of the marking pigment to the fixing material is from about 1:5 to about 5:1.

16. The laser marking coating of claim 9, wherein the weight ratio of the marking pigment to the fixing material is about 1:1.

17. The laser marking coating of claim 9, Wherein the fixing material has a melting point below about 1,300° C.

18. A method of marking a surface of a substrate comprising:
applying a marking material comprising a marking pigment and a fixing material to the surface of the substrate with a thickness of from about 0.1 to about 300 microns; and
irradiating a portion of the marking material with at least one laser beam to adhere the irradiated marking material on the surface of the substrate and to form a permanent marking thereon comprising the marking pigment and the fixing material.

19. The method of claim 18, wherein the marking pigment comprises titanium dioxide, zinc oxide and/or zinc sulfide.

20. The method of claim 18, wherein the marking pigment comprises titanium dioxide.

21. The method of claim 18, wherein the fixing material comprises at least one compound selected from the group consisting of bismuth trioxide, antimony oxide, lead oxide, vanadium pentoxide, molybdenum trioxide, alkaline earth silicates, and alkaline earth aluminosilicates.

22. The method of claim 18, wherein the fixing material comprises bismuth trioxide.

23. The method of claim 18, wherein the marking pigment comprises at least one compound selected from titanium dioxide, zinc oxide, and zinc sulfide, and the fixing material comprises at least one compound selected from the group consisting of bismuth trioxide, antimony oxide, lead oxide, vanadium pentoxide, molybdenum trioxide, alkaline earth silicates, and alkaline earth aluminosilicates.

24. The method of claim 18, wherein the marking pigment comprises tit num dioxide and the fixing material comprises bismuth trioxide.

25. The method of claim 18, wherein the weight ratio of the marking pigment to the fixing material is frog about 1:10 to about 10:1.

26. The method of claim 18, wherein the weight ratio of the marking pigment to the fixing material is from about 1:5 to about 5:1.

27. The method of claim 18, wherein the weight ratio of the marking pigment to the fixing material is about 1:1.

28. The method of claim 18, wherein the fixing material has a melting point below about 1,300° C.

29. The method of claim 18, wherein the permanent marking has a thickness of from 0 to about 100 microns measured from the surface of the substrate.

30. The method of claim 18, wherein the permanent marking has a thickness of from 0.05 to about 30 microns measured from the surface of the substrate.

31. The method of claim 18, further comprising removing a non-irradiated portion of the marking material from the substrate.

32. The method of claim 18, wherein the marking material is adhered to a backing material.

33. The method of claim 32, wherein the backing material is removed from the substrate after the laser begs irradiation.

34. The method of claim 18, wherein the substrate comprises glass.

35. The method of claim 18, wherein the substrate comprises ceramic.

36. The method of claim 18, wherein the substrate comprises brick.

37. The method of claim 18, wherein the substrate comprises stone.

38. The method of claim 18, wherein the substrate comprises metal.

39. The method of claim 18, wherein the substrate comprises a composite.

40. The method of claim 18, wherein the substrate comprises plastic.

* * * * *